United States Patent [19]

O'Brien

[11] 3,998,109
[45] Dec. 21, 1976

[54] AUTOMATIC TRANSMISSION CONTROL LINKAGE

[75] Inventor: Patrick H. O'Brien, Birmingham, Mich.

[73] Assignee: General Motors Corporation, Detroit, Mich.

[22] Filed: Sept. 15, 1975

[21] Appl. No.: 613,331

[52] U.S. Cl. .............................. 74/475; 74/501 R; 74/538

[51] Int. Cl.² ...................... G05G 1/02; G05G 1/06; G05G 5/06

[58] Field of Search ................ 74/473 R, 475, 476, 74/538, 501 R

[56] References Cited

UNITED STATES PATENTS

| | | | |
|---|---|---|---|
| 1,970,738 | 8/1934 | Collins | 74/335 |
| 2,320,878 | 6/1943 | Manning | 74/538 X |
| 3,202,246 | 8/1965 | Findley et al. | 74/475 X |
| 3,216,276 | 11/1965 | Nagy | 74/538 X |
| 3,449,980 | 6/1969 | Hulten | 74/473 R |
| 3,561,281 | 2/1971 | Wilfert | 74/473 R |
| 3,597,992 | 8/1971 | Lowry | 74/476 |

Primary Examiner—Allan D. Herrmann
Attorney, Agent, or Firm—A. M. Heiter

[57] ABSTRACT

A transmission shift lever pivotally mounted at one end and having at the other end a handle with a detent release button connected to push a detent release rod axially extending through a tubular lever portion to release a U-shaped detent member which is mounted on the lever and biased to engage detent notches on the internal diameter of a detent plate located about the pivot. The handle has a rigid core with a bore to reciprocally receive the release button and an elastic cover. The button has a cam and stop engaging a cam and stop on the cover to expand the cover to insert and retain the button biased to release position. In one form the button directly axially pushes on the release rod and in another form the button moves transversely and has a cam rotating a pivoted lever which supports the release spring and pushes the release rod. The release rod is made of plastic and in a curved portion of the tubular lever is integrally formed of a series of balls for guidance of the rod and thin flexible connecting links to transmit a push force to release the detent member.

6 Claims, 5 Drawing Figures

U.S. Patent Dec. 21, 1976 Sheet 2 of 2 3,998,109
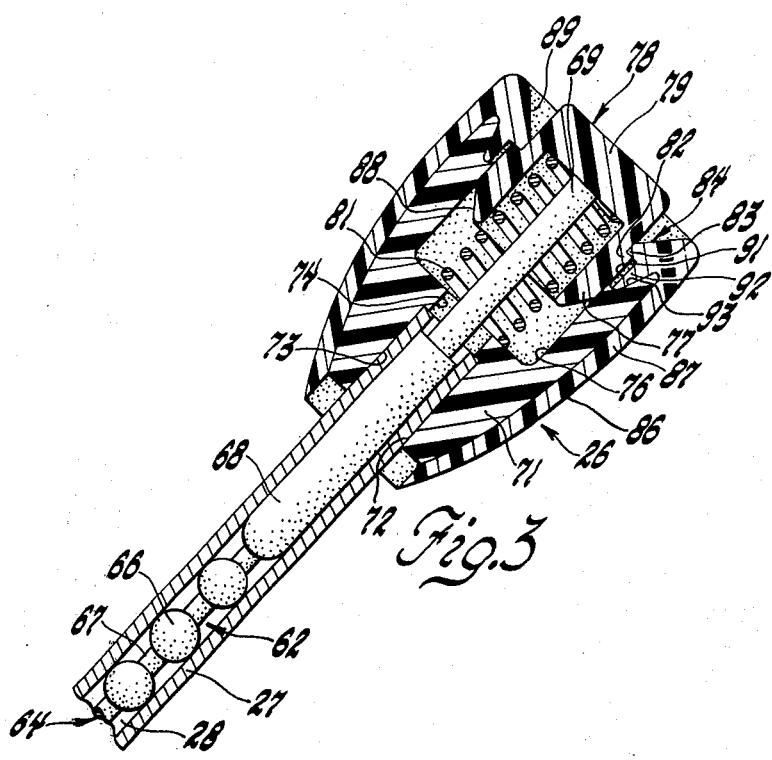
Fig. 3
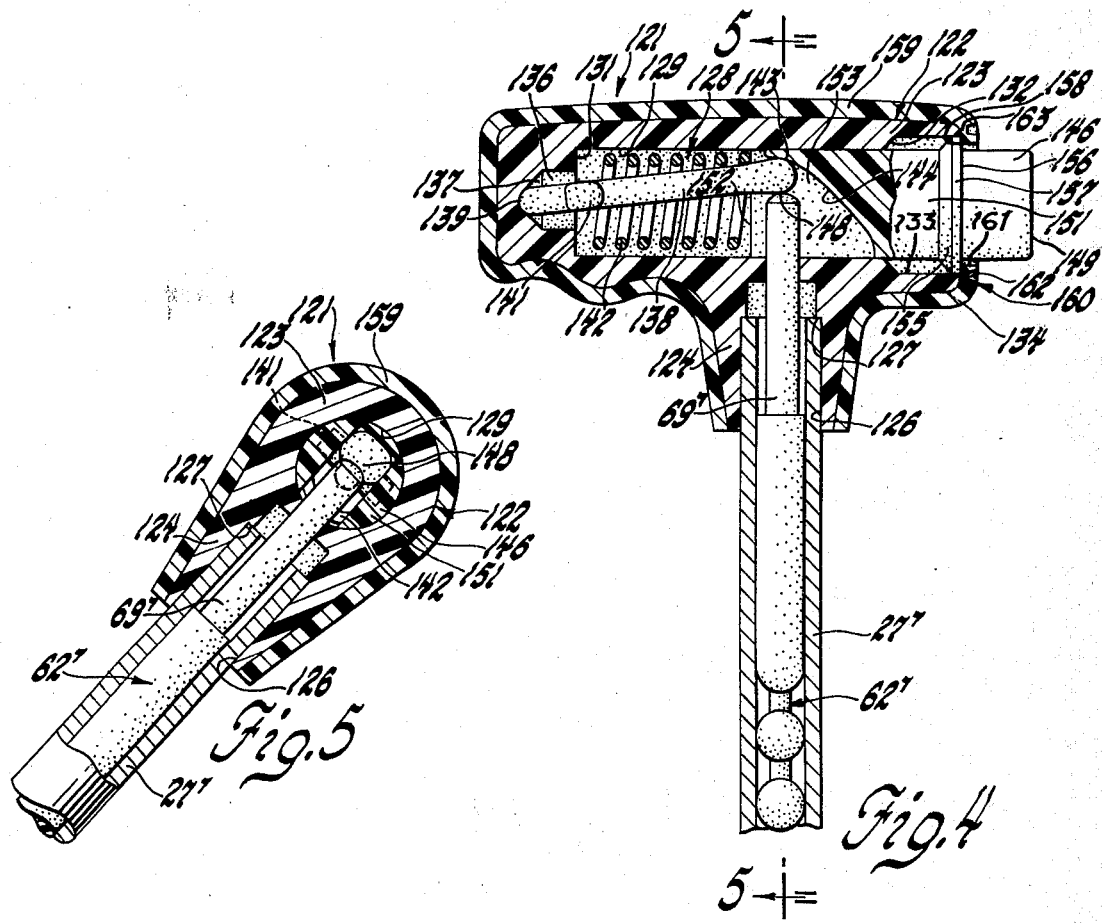
Fig. 5
Fig. 4

AUTOMATIC TRANSMISSION CONTROL LINKAGE

This invention relates to a transmission shift control lever and particularly to a shift control lever with a detent release mechanism.

This invention provides in a transmission shift control lever assembly having a shift lever pivotally mounted at one end on a support and a handle at the other end, an improved detent push rod release mechanism extending through the handle and a tubular lever portion to engage one leg of U-shaped detent release cam to move the release cam against a biasing spring which biases the other leg in detent engagement with a notched detent plate to the detent released position. The detent release mechanism has a handle with a detent release button which is pushed into the handle to push the detent release rod to release the button. The handle has a core of rigid material having a bore fitting on and secured to the end of the tubular lever portion. The rigid handle core has a cover of a resilient rubber-like material deforming within the elastic limit under low force to provide a soft comfortable feel when gripped and having sufficient elongation to stretch to permit assembly. The cover surface surrounding the perimeter lip of the mouth of a bore in the rigid core for the button has cam and stop portions. The cam portion of the cover is located beyond the end of the rigid core and thus expandable to cause expansion of the stop portion. The button has an annular cam and stop ring. When the button is moved into the button bore the cam portion of the button engages the cam portion of the cover and stretches and expands the cover stop portion to pass over the button stop portion. When the button is positioned in the bore, the cover stop portion snaps back behind the button stop portion to retain the button as biased by a spring in detent released position in the button bore. In one arrangement the button is pushed along the axis of the lever and directly pushes on the detent rod in the tubular lever to release the detent. In another arrangement, the button is mounted in the open end of a transverse closed bore and moved transversely to the lever axis to cause a cam surface to engage the cam end of a lever pivoted at the other closed end of the bore to swing the lever to push the detent rod to detent disengaged position. The lever and button have spring abutments for a return spring which holds the lever in a pivot recess in the closed end of the bore and biases the button to detent engaged position with the stops on button and cover engaged. The push rod is made of strong resilient plastic material and has solid straight end portions fitting the tubular lever bore and an intermediate portion having a series of balls fitting the bore of the curved portion of the tubular lever and thin flexible links connecting the balls and end portions.

These and other features of the invention will be more apparent from the following detailed description of the preferred embodiments and drawing.

FIG. 3 is an enlarged partial sectional view on line 3—3 of FIG. 2 of the hand knob portion.

FIG. 4 is an enlarged portion sectional view like FIG. 3 showing a modified hand knob portion.

FIG. 5 is a partial sectional view on the line 5—5 of FIG. 4.

Figure 1:
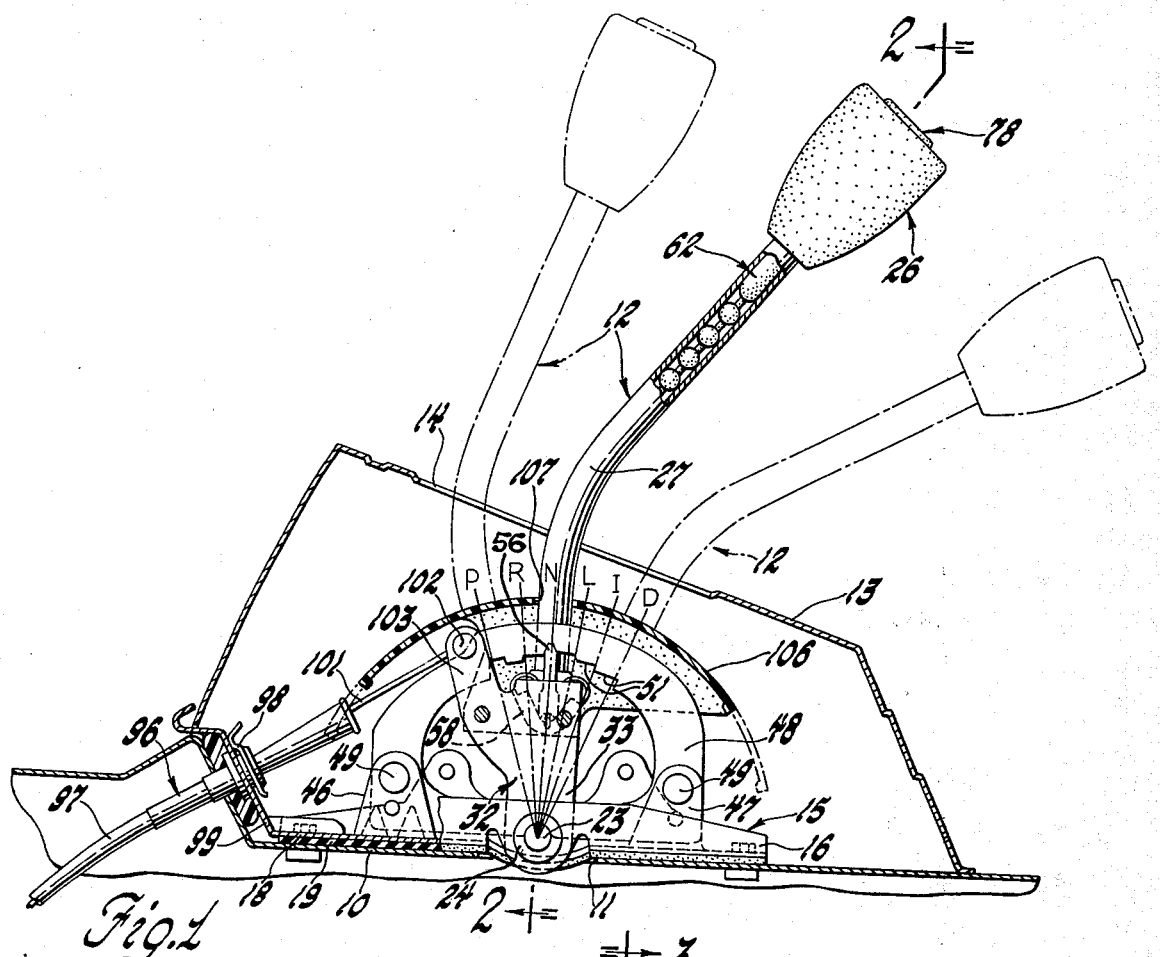
FIG. 1 is an elevation view of the shift linkage with parts in section.
Figure 2:
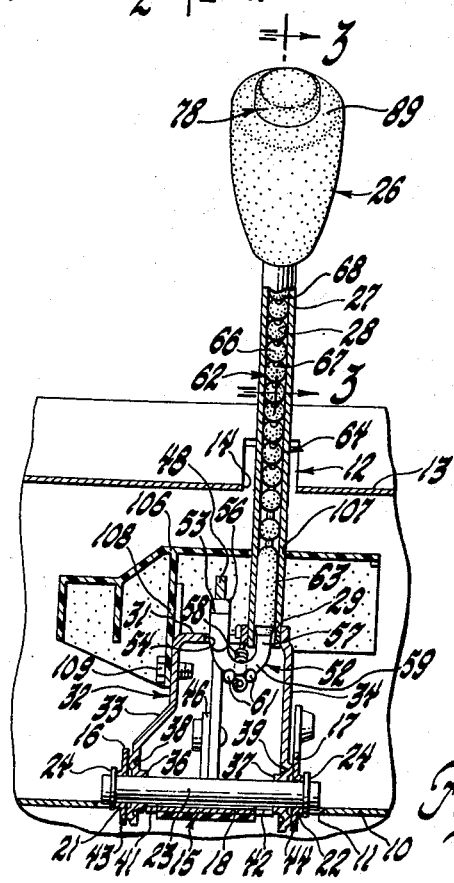
FIG. 2 is a partial sectional view on the line 2—2 of FIG. 1 of the shift linkage.

Referring to FIGS. 1 and 2, the shift linkage is mounted on a vehicle floor 10 having an opening 11 to provide clearance for the lower portion of the shift lever assembly 12 which may be covered by a conventional console or housing 13 having a slot 14 for pivotal movement of the shift lever. A support bracket 15 has a pair of parallel side walls 16, 17 bridging aperture 11 and a base portion 18 connecting the side walls and secured, e.g., by bolts to the floor 10 with a seal 19, e.g., a rubber sheet, between the base and floor. The side walls have bearings 21, 22 consisting of a stamped opening and an extruded axial flange to rotatably support the pivot shaft 23. Fasteners 24, such as snap rings are secured on both ends of pivot shaft 23 to prevent axial movement of the shaft relative to the pivot bracket.

The shift lever assembly 12 has a hand knob 26 secured to a tubular lever 27 having a bore 28. The tubular lever extends through a hole 29 formed in base 31 with an extruded cylindrical flange and is welded to the base portion 31 of lever bracket 32. The lever bracket 32 has at the ends of base 31 two legs or side portions 33–34 continuing the lever assembly 12 and having respectively bearings 36, 37 formed by stamping and extruding a cylindrical flange to pivotally mount the lever 12 on pivot pin 23 between side walls 16, 17 of the support bracket. The legs 33, 34 have stamped raised annular thrust bearings 38, 39 around bearings 36, 37 engaging the side walls 16, 17. The support bracket base 18 has apertures 41, 42 which provide clearance for legs 33, 34 and are formed by slitting the base so that when the side walls 16, 17 are bent 90° to vertical position, the base material moves with the side wall forming an aperture in the base and side wall portions 43, 44 extend below the base to provide wall material around the bearings 21, 22 with the pivot pin located closely adjacent or below the base end portions. The bracket base 18 between the apertures 41, 42 is depressed to provide clearance for pivot shaft 23. Support ears 46, 47, one forward and one rearward of the pivot pin 23, are formed by slitting the base and bending a base portion 90° to vertical position to form the ears. A semicircular detent plate 48 is secured at opposite ends by rivets 49 to ears 46, 47. The detent plate 48 is located radially outwardly of lever bracket base 31 and has on its inner diameter detent notches 51, a V notch for neutral N, rearwardly step notches for low, intermediate and drive L, I and D and forwardly a step notch for reverse R and a recessed notch for park P. A U-shaped detent member 52 has a guide leg 53 slidably mounted in aperture 54 in base portion 31. The guide leg 53 has a cam end 56 having a V-shape to match the neutral V notch N. The operator leg 57 is guided in bore 28 of the tubular lever. A coil spring 58 has circular hooks at each end secured in apertures in the sides of lever bracket base portion 31 and is looped around the bight or curved base portion 59 between a pair of locating projections 61 stamped on the outer perimeter of this curved base portion 59 of the U-shaped detent member 52 to bias it to engaged position. A flexible operator detent push release rod 62 located in bore 28 of handle portion 27 has a cylindrical portion 63 fitting bore 28 and engaging operator leg 57, a ball and link portion 64 consisting of a series of balls 66 and alternate thin flexible connecting links 67 connecting the balls to each other and at the ends connecting a ball to operated cylindrical portion 63 and to operating cylindrical portion 68. The operator detent rod 62 is a one piece or integral plastic molded part made of a plastic having good strength properties and sufficient flexibility so the thin links will bend in the central curved portion of the lever 27 and permit bending of the detent rod 62. Conventional polymers and resins made for use as structural parts such as polyamid polymers, nylon may be used to mold the detent rod 52.

Referring to FIG. 3, the operator rod cylindrical portion 68 in the upper end of lever 27 has a cam portion 69 extending into the knob 26. The knob has a core portion 71 made of a strong rigid plastic polymer or resin material having a flexural modulus of about 400,000 psi and about 10 to 40 percent elongation such as an Acrulonitrile Butadiene Styrene polymer.

The core portion 71 has a through bore 72 with a small bore portion 73 secured on a knurled or threaded end of lever 27 which is axially located by a shoulder 74. Beyond the shoulder, the core portion 71 has a large bore portion 76 providing a cylindrical guide surface for the cylindrical wall portion 77 of cup shaped button 78. The button 78 has a base 79 with an inner surface engaging cam portion 69 and one end of coil spring 81 whose other end abuts shoulder 74 to bias the button 78 to detent engaged position, as shown in FIG. 3, with stop shoulder 82 on cylindrical wall 77 engaging retaining shoulder 83 on a retaining portion 84 of skin or cover 86 having a side portion 87 surrounding the core. The cover is bonded to the core portion 71. The button 78 is made of a strong rigid plastic material having a flexural modulus of about 400,000 psi and about 10 to 40 percent elongation such as an acetal homopolymer or copolymer.

The skin or cover 86 is made of a strong soft elongatable and resilient polymer or resin rubber-like material having a flexural modulus of about 5,000 psi and about 200 to 400 percent elongation such as a Polyvinyl Chloride.

The button 78 has on the end of cylindrical wall 77 an externally sloped conical cam surface 88. The cover retention portion 84 at the upper end of the knob has an internally sloped conical cam surface 89 matching the cam surface 88 on the button and extending inwardly to the retention stop shoulder 83. The retention portion 84 of the cover has a cushion portion 91 beyond the end of the core around the lip of the mouth of bore 76 and an annular anchor portion 92 anchored in an annular recess 93 in the end wall of the core 71. The knob 26 is assembled by placing the button so its cam surface 88 engages cam surface 89 and stretches and displaces the retention portion with bending and displacement in the cushion portion 91 permitting retention shoulder 83 to expand over cylindrical wall 77 and then snap back over stop shoulder 82 to retain the button in normal detent engaged position against the bias of return spring 81.

The lever 12 is connected to the transmission (not shown) by a sheathed cable 96 having a sheath 97 secured by a fastener 98 to a support member 99 formed as an extended portion of the base 18 of support bracket 14 and a wire 101 conventionally secured by pin 102 to arm 103 of leg 33 of bracket 32 of lever assembly 12. A plastic shield 106 has a hole 107 through which lever 12 passes and arms 108 secured by screws 109 to leg 33 of lever bracket 32.

The modified transverse handle 121 is secured to a similar lever 27' and has a core portion 122 having a transverse handle part 123 and an attaching part 124. The core is made of a strong rigid polymer material like core 71. The attaching part 124 has a stepped bore 126 with a shoulder 127 to receive the tubular lever 27'. The lever 27' is threaded or knurled to secure the lever to the attaching part 124. The handle portion 123 has a stepped circular bore 128 having long small bore portion 129 extending from the end wall 131 closing one end of the bore to a sloped step 132 to a short large bore portion 133 to the bore mouth at the end 134 of handle core portion 123. A pivot recess 136 in wall 131 has a V pivot groove 137 extending diametrically across the bore transversely to the handle 27'. A cam lever 138 has a rectangular section and at one end a rounded V pivot end 139 with the pivot edge on the long axis of the rectangular section pivoted in the V pivot groove for pivotal movement of the lever about its pivot end without turning. The lever 138 has adjacent the pivot end an integral cross bar 141 providing a fixed abutment for coil return spring 142 which is located around cam lever 138 and guided by bore 128. The other end of the cam lever 138 has an enlarged rounded cam end 143 engaging a curved slope cam surface 144 on button 146 and a side cam surface 148 engaging the top end of operator portion 69' of the flexible detent rod 62'. The cylindrical button member 146 has a button portion 149 and a guide portion 151 both having the same diameter with the guide portion 151 reciprocally mounted in bore portion 129 of the handle core. The cylindrical guide portion 151 has an end wall 152 consisting of a part on each side of recess 153 for cam surface 144. The spring 142 engages end wall 152 and biases the button member 146 to the detent released position shown in which a stop surface 156 on cam and stop shoulder 157 engages a stop shoulder surface 158 on the skin or cover 159 bonded on the core 122. The cam and stop shoulder 157 also has a cam surface 155 for assembly described below. The cover 159 is a thin layer of elastic resilient rubber-like polymer material having a high degree of elongation and resilient deformation with moderate forces like cover 86 and covers and is bonded to core 122. The button 146 and lever 138 are strong rigid polymers such as polyamid polymers like "Nylon" similar to above button 78.

At the open end, or mouth, of bore 133, the cover 159 has a curved portion bending around the end 134 of the core with the end portion 160 transverse to the bore to provide the annular stop shoulder 158 and an annular opening and cam surface 161 with clearance for the button cylindrical portion 149. The annular cam surface 161 is normally disposed parallel to cylindrical portion 149. An annular recess 162 in the outer surface of the cover closely adjacent and surrounding the cam surface leaves a remaining annular hinge portion 163 at the inner surface of the cover around the cam surface 161.

The detent release mechanism is assembled in handle 121 by placing the pivot end of the cam lever 138 in bore 126 with the pivot end 139 in pivot recess 136. The spring 142 is preferably placed on the lever and both inserted together in the bore. Then the button 146 is inserted in the mouth of bore 133 with the button guide portion 151 guiding entry into the bore. Then the cam surface 155, which is a conical surface tapering from the larger diameter of the cam and stop shoulder 157 to the cylindrical guide surface, engages cam surface 161 on the cover to cause bending in the hinge portion and substantial close recess 162 to move cover cam surface 161 to a position substantially in surface contact with cam surface 155 to stretch and expand the mouth portion of the cover surrounding the bore to permit the shoulder 157 to pass through the cover cam and stop portion. Then the cover cam and stop portion snaps back to the normal position in which cover stop surface 158 engages button stop surface 156 to retain button 146 as biased by its return spring 142 in detent engaged position.

In the detent released position of the button 146, its cam surface 144 engages cam end surface 143 of lever 138 and detent release spring 58 biases detent rod 62' so the end of cam portion 69' engages the side cam 148 of lever 138 to hold the lever cam end 143 engaged with button cam surface 144. On movement of the button from this detent engaged position, the button cam surface 144 continues in contact with lever cam surface 143 and swings the lever 138 to push detent rod 62' to release position. Button movement is limited by cam surface 155 engaging step shoulder 132 which have the same slope. On manual release of button 146 the detent return spring 58 and button apply spring 142 return the detent release mechanism to detent engaged position.

It will be appreciated that the invention described with reference to the preferred embodiments may be used in modified form.

What is claimed is:

1. In a transmission control linkage; a support having a detent member; a lever, a handle end and a pivot end pivotally mounted on said support; detent means having a detent engaging portion, a detent rod mounted on said lever and biasing means biasing said detent engaging portion to engage said detent member and said detent rod toward the handle end of said lever; a hand grip member having a rigid core with a hand grip portion having a button bore open at the surface of the hand grip portion and an attaching portion secured to the handle end of said lever and said detent rod extending through said core into said button bore and a cover of resilient rubber like polymer material bonded to said core and having a displaceable portion, an annular cam and flat stop portion on said displaceable portion extending beyond said surface of said core and said cam and stop portion surrounding the open end of said button bore; a button having a annular tapered cam and flat stop portion and said cam and stop portions having cams engaging for expanding said cam and stop portion and displaceable portion of said cover while forcibly inserting said button in said button bore until said button cam and stop portion passes through said cover cam and stop portion and said cover cam and stop portion returns to normal position in which the flat stop portions on said button and cover engage to retain said button in detent engaged position; means connecting said button to said detent rod for conjoint movement; said biasing means biasing said detent rod and button normally to the outer detent engaged position and operative on manual movement of said button into said button bore to detent released position to move said detent rod to move said detent means to detent released position.

2. In a transmission control linkage; a support having a detent member; a tubular lever having a lever bore, a handle end and a pivot end pivotally mounted on said support; detent means having a detent engaging portion, a detent rod in said tubular lever bore and biasing means biasing said detent engaging portion to engage said detent member and said detent rod toward the handle end of said lever bore; a hand grip member having a rigid core with a hand grip portion having a button bore open at the surface of the hand grip portion and an attaching portion having an attaching bore fitting on and secured to the handle end of said lever and interconnecting with said button bore; said detent rod extending through said attaching bore into said button bore and a cover of resilient rubber like polymer material bonded to said core and having a displaceable portion, an annular cam and flat stop portion on said displaceable portion extending beyond said surface of said core and said cam and stop portion surrounding the open end of said button bore; a button having an annular tapered cam and flat stop portion and said cam and stop portions having cams engaging for expanding said cam and stop portion and displaceable portion of said cover while forcibly inserting button in said button bore until said button cam and stop portion passes through said cover cam and stop portion and said cover cam and stop portion returns to normal position in which the flat stop portions on said button and cover engage to retain said button in detent engaged position; means connecting said button to said detent rod for conjoint movement; a biasing spring mounted in said button bore and engaging said button to bias said button normally to the outer detent engaged position and operative on manual movement of said button into said button bore to detent released position to move said detent rod to move said detent means to detent released position.

3. In a transmission control linkage; a support having a detent member; a lever, a handle end and a pivot end pivotally mounted on said support; detent means having a detent engaging portion, a detent rod mounted on said lever and biasing means biasing said detent engaging portion to engage said detent member and said detent rod toward the handle end of said lever; a hand grip member having a rigid core with a hand grip portion having a button bore open at the surface of the hand grip portion and an attaching portion secured to the handle end of said lever and said detent rod extending through said attaching core into said button bore and a cover of resilient rubber like polymer material bonded to said core and having an annular recess and a thin annular hinge portion surrounding said button bore forming an annular displaceable portion, an annular normally cylindrical cam and flat stop portion on said displaceable portion extending beyond said surface of said core and said cam and stop portion surrounding the open end of said button bore; a button having an annular tapered cam and flat stop portion and said cam and stop portions having cams engaging for pivotally moving said displaceable portion about said hinge and expanding said displaceable portion to provide surface engagement of its cam with said cam on said button expanding said cam and stop portion and displaceable portion of said cover while forcibly inserting said button in said button bore until said button cam and stop portion passes through said cover cam and stop portion and said cover cam and stop portion returns to normal position in which the flat stop portions on said button and cover engage to retain said button in detent engaged position; means connecting said button to said detent rod for conjoint movement; said biasing means biasing said detent rod and button normally to the outer detent engaged position and operative on manual movement of said button into said button bore to detent released position to move said detent rod to move said detent means to detent released position.

4. In a transmission control linkage; a support having a detent member; a tubular lever having a lever bore, a handle end and a pivot end pivotally mounted on said support; detent means having a detent engaging portion, a detent rod in said tubular lever bore and biasing means biasing said detent engaging portion to engage said detent member and said detent rod toward the handle end of said lever bore; a hand grip member having a rigid core with a hand grip portion having a button bore open at the surface of the hand grip portion and an attaching portion having an attaching bore fitting on and secured to the handle end of said lever and interconnecting with said button bore; said detent rod extending through said attaching bore into said button bore and a cover of resilient rubber like polymer material bonded to said core and having an annular recess and a thin annular hinge portion surrounding said button bore forming an annular displaceable portion, an annular cam and flat stop portion on said displaceable portion extending beyond said surface of said core and said cam and stop portion surrounding the open end of said button bore; a button having an annular tapered cam and flat stop portion and said cam and stop portions having cams engaging for pivotally moving said displaceable portion about said hinge to provide surface engagement of its cam with said cam on said button expanding said cam and stop portion and displaceable portion of said cover while forcibly inserting said button in said button bore until said button cam and stop portion passes through said cover cam and stop portion and said cover cam and stop portion returns to normal position in which the flat stop portions on said button and cover engage to retain said button in detent engaged position; means connecting said button to said detent rod for conjoint movement; a biasing spring mounted in said button bore and engaging said button to bias said button normally to the outer detent engaged position and operative on manual movement of said button into said button bore to detent released position to move said detent rod to move said detent means to detent released position.

5. In a transmission control linkage; a support having a detent member; a tubular lever having a lever bore, a handle end and a pivot end pivotally mounted on said support; detent means having a detent engaging portion, a detent rod in said tubular lever bore and biasing means biasing said detent engaging portion to engage said detent member and said detent rod toward the handle end of said lever bore; a hand grip member having a rigid core with a transverse hand grip portion having a transverse bore open at one end and closed at the other end and an axial attaching portion having an attaching bore fitting on and secured to the handle end of said lever and receiving said detent rod and a cover of resilient rubber like polymer material bonded to said core and having an annular cam and stop portion on a displaceable cover portion extending beyond said one end of said core and surrounding the open end of said transverse bore; a cylindrical button having an annular tapered cam and stop portion; said cam and stop portions having cams engaging for expanding said cam and stop portion and displaceable portion of said cover wile forcibly inserting said button in said transverse bore until said button cam and stop portion passes through said cover cam and stop portion and said cover cam and stop portion returns to normal position in which the stop portions on said button and cover engage to retain said button in detent engaged position; said button having a cam surface extending toward said closed end and sloping away from said attaching bore and a spring abutment and guide portion extending beyond said cam surface toward said closed end of said bore having a spring abutment face and guide portions on each side of said cam surface fitting said transverse bore; a pivot recess in said hand grip core portion at the closed end of said bore facing said open end of said bore; a cam lever in said bore having a pivot end in said pivot recess, a cam end engaging said cam surface and the end of said detent rod and a transverse spring abutment adjacent said pivot end; a biasing spring compressed between said transverse spring abutment on said cam lever and said spring abutment face on said button to hold said cam lever pivot end in said pivot recess and said button normally in the outer detent engaged position and operative on manual movement of said button into said button bore to detent released position to cause said cam surface in engagement with said cam end of said cam lever to swing said cam lever to move said detent rod to move said detent means to detent released position.

6. In a transmission control linkage; a support having a detent member a tubular lever having a lever bore, a handle end and a pivot end pivotally mounted on said support; detent means having a detent engaging portion, a detent rod in said tubular lever bore and biasing means biasing said detent engaging portion to engage said detent member and said detent rod toward the handle end of said lever bore; and hand grip member having a rigid core with a transverse hand grip portion having a transverse bore open at one end and closed at the other end and an axial attaching portion having an attaching bore fitting on and secured to the handle end of said lever and receiving said detent rod and a cover of resilient rubber like polymer material bonded to said core and having a annular cam and flat stop portion on a displaceable cover portion having an annular recess and thin annular hinge portion between said displaceable cover portion and the adjacent cover portion located beyond said one end of said core and surrounding the open end of said transverse bore; a cylindrical button having an annular tapered cam and flat stop portion having a shorter axial length than said annular recess and said cam and stop portions having cams engaging for pivotally displacing said displaceable portion with said cam for surface engagement of its cam with said cam on said button for expanding said cam and stop portion and displaceable portion of said cover while forcibly inserting said button member in said transverse bore until said button cam and stop portion passes through said cover cam and stop portion and said cover cam and stop portion returns to normal position in which the flat stop portions on said button and cover engage to retain said button in detent engaged position; said button having a cam surface extending toward said closed end and sloping away from said attaching bore and a spring abutment and guide portion extending beyond said cam surface toward said closed end of said bore having a spring abutment face and guide portions on each side of said cam surface fitting said transverse bore; a pivot recess in said hand grip core portion at the closed end of said bore facing said open end of said bore; a cam lever in said bore having a pivot end in said recess, a cam end engaging said cam surface and the end of said detent rod and a transverse spring abutment adjacent said pivot end; a biasing spring compressed between said transverse spring abutment on said cam lever and said spring abutment face on said button to hold said cam lever pivot end in said pivot recess and said button normally in the outer detent engaged position and operative on manual movement into the bore to detent released position to cause said cam surface in engagement with said cam end of said cam lever to swing said cam lever to move said detent rod to move said detent means to detent released position.

* * * * *